(12) United States Patent
Johnson et al.

(10) Patent No.: US 6,191,721 B1
(45) Date of Patent: Feb. 20, 2001

(54) TIME BASED DIGITAL-TO-ANALOG CONVERSION OF A PRECISION VARIABLE AMPLITUDE SINE WAVE

(75) Inventors: Gregory M. Johnson, Goleta; John C. Baker, Santa Barbara; Daniel T. Zaida, Goleta; Patrick A. Toole, Santa Barbara, all of CA (US)

(73) Assignee: Litton Systems, Inc., Woodland Hills, CA (US)

( * ) Notice: Under 35 U.S.C. 154(b), the term of this patent shall be extended for 0 days.

(21) Appl. No.: 09/435,000

(22) Filed: Nov. 5, 1999

(51) Int. Cl.[7] .................................................. H03M 1/66
(52) U.S. Cl. ............................ 341/147; 375/285; 375/346
(58) Field of Search .................................... 341/147, 144, 341/120, 152, 53; 375/238, 239, 264, 286, 328, 285, 346; 73/504.02, 504.13, 504.15

(56) References Cited

U.S. PATENT DOCUMENTS

| | | | |
|---|---|---|---|
| 3,739,374 | * 6/1973 | Kiowski | 341/147 |
| 3,922,613 | * 11/1975 | Allen et al. | 375/371 |
| 4,951,508 | * 8/1990 | Loper, Jr. et al. | 73/504.13 |
| 5,041,831 | * 8/1991 | Bohley et al. | 341/144 |
| 5,859,368 | * 1/1999 | Cargille | 73/504.15 |
| 5,959,498 | * 9/1999 | Sauer | 327/124 |
| 6,079,270 | * 6/2000 | Matthews et al. | 73/504.02 |

* cited by examiner

*Primary Examiner*—Howard L. Williams
*Assistant Examiner*—Jean Breener JeanGlaude
(74) *Attorney, Agent, or Firm*—Price and Gess

(57) ABSTRACT

A time based digital to analog converter is presented in which known reference voltages are used to create variable period waveforms which, when combined according to a desired computation, can convert digital words into a sinusoidal signal of a precision variable. To illustrate the application of the present invention, a hemispherical resonator gyroscope (HRG) operating in force rebalance is presented wherein a time based digital to analog converter with a variable period output controls the HRG electronics in nulling the standing wave. A rate of the standing wave is calculated, and a software component calculates the fraction of the maximum rate needed to oppose and null the initial rate of the standing wave. The fraction of the maximum rate is converted to digital words corresponding to the number of periods of a clock connected to the circuit. Using the digital words thus determined, a gate array using digital logic generates waveforms having variable periods, where the amplitude of the waveforms correspond to fixed reference voltage sources, and the period of the waveforms are determined by the digital words in the earlier calculation. Using the waveforms, the HRG rate controls can be maintained at a high level of precision.

15 Claims, 3 Drawing Sheets

TIME BASED DIGITAL-TO-ANALOG CONVERSION OF A PRECISION VARIABLE AMPLITUDE SINE WAVE

BACKGROUND OF THE INVENTION

1. Field of the Invention

The present invention relates to the field of digital signal processing, and more particularly to a digital-to-analog conversion using a time based pulse width to ensure a known and unchanging relationship between the input digital word and a resultant sine wave amplitude.

2. Description of Related Art

Digital-to-analog conversion is the process of converting digital codes into a continuous range of analog signals. Analog-to-digital conversion is the complementary process of converting a continuous range of analog signals into digital codes. These conversions are important to interface real-world systems, which typically monitor continuously varying analog signals, with digital systems that process, store, interpret, and manipulate the analog values.

The resolution of a digital-to-analog converter is the smallest change in the voltage that can be detected by the system and that can produce a change in the digital code. The resolution determines the total number of digital codes, or quantization levels, that will be recognized or produced by the converter. The resolution of the D/A converter is usually specified in terms of the bits in the digital code or in terms of the least significant bit (LSB) of the system. An n-bit code allows for $2^n$ quantization levels. As the number of bits increases, the step size between quantization levels decreases, therefor increasing the accuracy of the system when a conversion is made between an analog and digital signal.

Digital codes are typically converted to analog voltages by assigning a voltage weight to each bit in the digital code and then summing the voltage weights of the entire code. A typical digital converter consists of a network of precision resistors, input switches, and level shifters to activate the switches to convert a digital code to an analog current or voltage.

Digital converters commonly have a fixed or variable reference level. The reference level determines the switching threshold of the precision switches that form a controlled impedance network, which in turn controls the value of the output signal. Fixed reference digital converters produce an output signal that is proportional to the digital input. Multiplying digital converters produce an output signal that is proportional to the product of a varying reference level times a digital code.

An example of the applications for digital to analog converters is presented herein to illustrate the benefits of the present invention. Hemispherical resonator gyroscopes are known in the art for measuring an angular rate of a body about a predetermined axis. HRGs are of critical importance in space applications, such as the orienting of satellites and space vehicles. HRGs are reliable and have a long active life, making the gyro especially suited for this purpose. The gyros are typically comprised of a forcer electrode assembly, a hemispherical thin-walled quartz shell, and a pick-off electrode assembly joined together with a rare-earth metal such as indium. The unit is housed in a vacuum chamber with electrical feeds to communicate voltage signals from the gyro to a microprocessor for interpretation. The general operation of the gyroscope is discussed in the Letters Patent to Loper, Jr. et al., U.S. Pat. No. 4,951,508, which is fully incorporated herein by reference.

The hemispherical resonator 10 is a bell-shaped thin walled structure with a rim that can be made to deform from a circular profile to an elliptical profile when subjected to certain external electrical fields. The resonator is supported by an integral stem which itself is supported by the housing for the pick-off and forcer electrodes. By applying a cyclical forcing voltage, a standing wave pattern can be established in the resonator. To establish the standing wave, the hemispherical resonator is initially biased at a voltage of known magnitude, and then a varying electrical field is applied at the forcer electrodes. If the forcer electrodes apply the appropriate varying electrical field at angular intervals of 90 degrees, the resonator will flexure in a standing wave such as that shown in FIG. 1.

The primary harmonic resonating wave has four nodes a,b,c,d and four antinodes e,f,g,h around the perimeter of the resonator, alternating and equal spaced forty-five degrees apart. Nodes are points on the standing wave where displacement is a minimum, and antinodes are points on the standing wave where displacement is a maximum. Operation of the HRG requires precise tracking of the standing wave movement, which in turn requires that the location of the nodes and antinodes be accurately determined.

It is a physical property of the gyroscope that if an unrestrained resonator is rotated about an axis normal to the page (see FIG. 2), the standing wave will precess in an opposite direction to the original rotation due to Coriolis force. Moreover, the amount of the angular precess will be 0.3 times the angular displacement of the resonator, where 0.3 is a geometric property of the resonator's hemispherical shape and holds constant for any rotation angle and any rotation rate. For example, if the resonator of FIG. 1 is rotated ninety degrees in the counter-clockwise direction, as indicated by the angular displacement of the notch 20, the standing wave will precess twenty-seven degrees clockwise as shown in FIG. 2. In this manner when an HRG is rotated about its primary axis, by measuring the change in the angular position of the standing wave information about the rotation of the HRG can be determined.

The position of the standing wave both before and after the rotation of the gyroscope is determined by the pick-off electrodes positioned about the external annular component of the housing. By measuring the capacitance across the gap formed between the pick-off electrodes and the resonator, the distance across the gap can be accurately determined. This information is processed by a microprocessor in a manner such that the exact position of the standing wave is determined. By measuring the change in position of the standing wave, the rotation of the gyro can readily be determined.

The gyro of the present example employs a rate control loop that uses the rate drive to null the in-phase nodal amplitude component, i.e., standing wave deflection. FIG. 3 is a representation of a rate control loop, where the box 30 represents a model of the HRG mechanics. The model includes a scale factor K which converts volts to an electrostatic force that cancels the coriolis force due to an inertial input, and the resultant difference force to dynamic response P(s) of the in-phase nodal amplitude $y_i$. The difference force includes a thermal noise component $\Omega_{TN}$ as well as a bias component $\Omega_B$. The input from the HRG pick-off is amplified 40 and converted to a digital signal 50 where a microprocessor 60 can analyze the signal and output a rate estimate R. The digital rate estimate is supplied to the digital to analog converter which generates an HRG phase synchronous signal of the necessary amplitude to maintain $Y_i$ at zero.

The function of the digital-to-analog converter ("DAC") 70 in this example is to change a digital word into an analog voltage or current signal. In this case, the digital word represents the amplitude of the input inertial rate, and the DAC converts the digital word into the representative sine wave equivalent. The output from the DAC supplies the necessary control voltage to maintain the resonant standing wave at null in the presence of inertial forces. Any amplitude error in the sine wave generated by the DAC directly corrupts the estimate of the inertial rate being sensed by the HRG when used in a digital force rebalance control mechanism.

The prior art technique employed to generate the control voltage to maintain the HRG at null is a time-invariant digital-to-analog converter that produces a square wave at the necessary frequency and amplitude. The amplitude of the first harmonic sine wave is known to be $4/\pi$ times the square wave amplitude. However, the accuracy of the square wave amplitude is limited by the accuracy of the DAC. A good 12-bit DAC is typically around 49 parts-per-million ("PPM") relative to full scale. This accuracy is insufficient for most HRG applications, so the conventional DAC is factory calibrated to 0.5 PPM (equivalent to a 22-Bit converter). However, the factory calibration starts degrading immediately, and after twelve years in a modest thermal environment, the calibration of the conventional DAC can degrade as much as 25 percent of the uncalibrated level. This results in unacceptable accuracy from the HRG.

OBJECTS AND SUMMARY OF THE INVENTION

The present invention seeks to overcome the shortcomings of the prior digital to analog converters by using a time based converter which adjusts the pulse width of a fixed amplitude repetitive signal. A digital process computes the necessary output signal for the desired application, such as the rate command that is required to null the HRG sensed input rate in the example previously discussed. The digital process subsequently computes the required time duration of the variable period signals to be generated by the digital support logic in the pulse width computing step.

BRIEF DESCRIPTION OF THE DRAWINGS

The exact nature of this invention, as well as its objects and advantages, will become readily apparent upon reference to the following detailed description when considered in conjunction with the accompanying drawings, in which like reference numerals designate like parts throughout the figures thereof, and wherein.

DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein specifically to provide a time-based digital-to-analog conversion of a precision variable sine wave.

Figure 1:
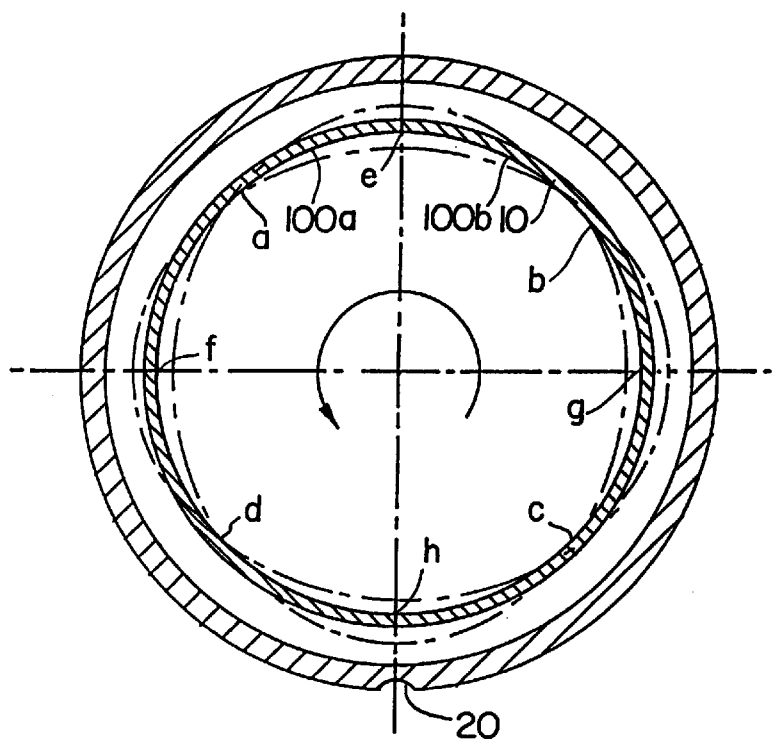
FIG. 1 is a diagram of a standing wave of the type generated by a hemispherical resonator gyroscope.
Figure 2:
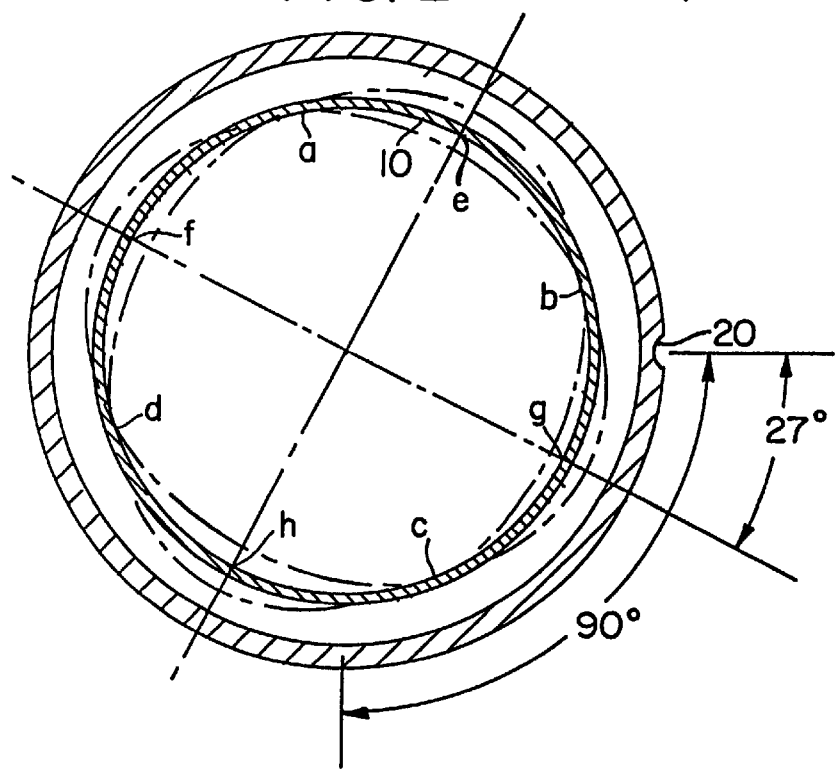
FIG. 2 is a diagram of the standing wave of FIG. 1 after the hemispherical resonator gyroscope has been rotated about an axis normal to the page by ninety degrees.
Figure 3:
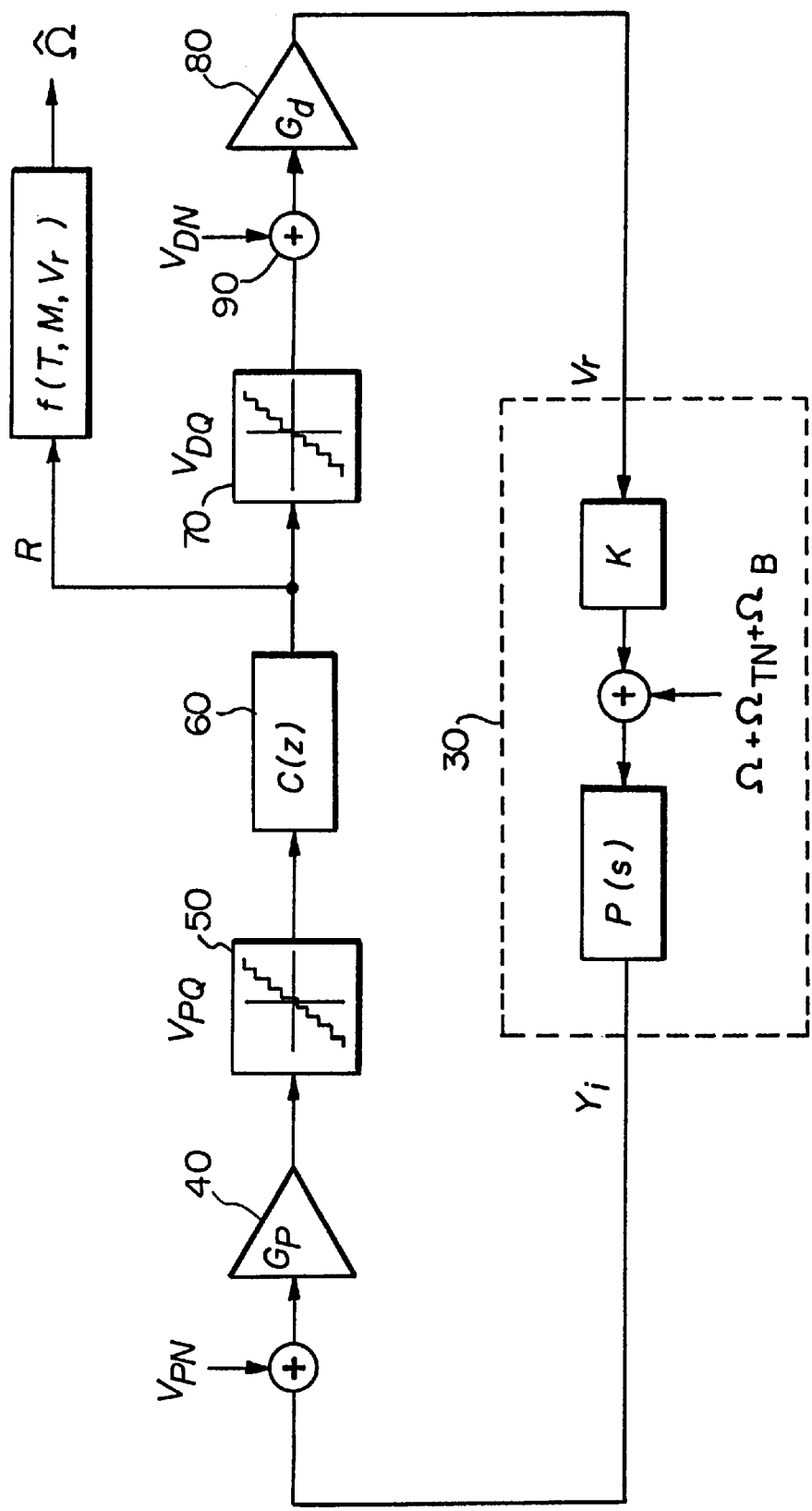
FIG. 3 is a schematic diagram of a rate control loop for a hemispherical resonator gyroscope.
Figure 4:
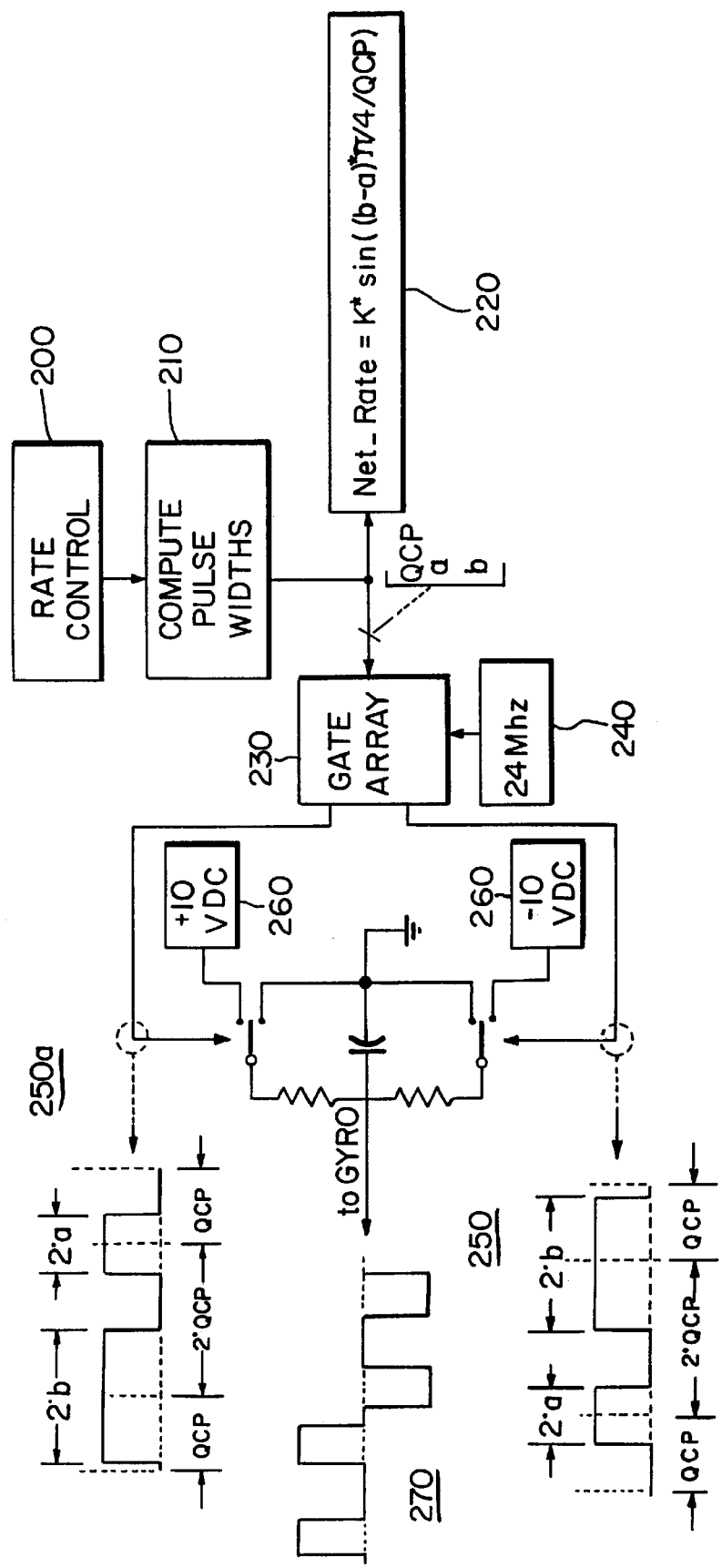
FIG. 4 is a schematic diagram of a preferred embodiment of the digital-to-analog converter of the present invention.

FIG. 4 is a functional block diagram describing how the fixed amplitude repetitive signal is generated by the electronics. The Rate Control block 200 is a software element that calculates the digital output corresponding to the desired control signal. In the example discussed above, the digital output corresponds to the rate estimate into the HRG based upon the present and past values of the nodal pickoff electrodes. The Compute Pulse Widths block 210 is a software element that converts the digital output, such as for example the rate estimate and the estimate of the flexing period of the HRG, into two digital words, along with the period of the input signal, that define the key parameters required to generate the repetitive signal that is applied to the rate control electrodes. The Compute Pulse Widths block 210 could comprise a program such as that illustrated below:

```
Begin
    V=asin(abs(Rate)/2^0.5)*T*24000000/pi
    QCP=T*24000000/4
    IF Rate<0, THEN
        a=(QCP+V)/2
        b=(QCP-V)/2
    ELSE
        a=(QCP-V)/2
        b=(QCP+V)/2
END
```

Rate Control block 200 provides an input to the controls for the HRG control electrodes. The output is a digital word which represents the sine wave voltage signal necessary to null the standing wave in the HRG. The Computer Pulse Block 210 receives the digital word from the rate control loop and computes two digital control words that will be used by dedicated counters in a gate array. The variable "Rate" delivered to the Compute Pulse Width Block is the fraction of the maximum rate of the HRG forcer electrode necessary to null the standing wave. The parameter "T" is the estimate of the HRG flexing mode frequency period that is measured and computed by the phase-lock tracking loop. Using a program such as the one illustrated above, the Compute Pulse Width Block outputs values "a", "b", and "QCP" from the input variables "Rate" and "T." The outputs "QCP," "a," and "b" have quantified units of the basic clock period of the mechanism, such as for example a 24 MHz clock. Residual clock fractions are saved and utilized in subsequent iterations of the Compute Pulse Width Block. These values "QCP," "a," and "b" are used to recompute the rate estimate to account for truncation in the quantified units of the basic clock, by a block which calculates "Net_Rate" based on the following formula:

$$\text{Net\_Rate} = K \sin((b-a) \times \pi 4/QCP)$$

The value of Net_Rate computed in the Net_Rate Block 220 is proportional to the amplitude of the first harmonic sine wave of the resultant repetitive signal which is the only harmonic that the HRG is sensitive to. The values "QCP," "a," and "b" are directed to a Gate Array block 230 with a clock 240. The Gate Array block 230 is comprised of dedicated digital counters that generate the two digital signals as shown, where the QCP, a, and b digital words are the number of periods of a 24 Mhz clock that the signal is a one or zero. The gate array 230 uses digital logic that generates the waveforms 250a, 250b such as those illustrated in FIG. 4. These digital signals control switching elements that switch between precision +10 and −10 VDC references and ground that are subsequently summed. Using the switching logic and the two reference voltage generators 260, a resultant repetitive signal 270 is produced with a variable period based on the values of a and b. The repetitive signal 270 is applied to the rate control electrodes after some filtering by a low pass filter (not shown). The variable waveform is routed directly to the HRG control electrodes which null the standing wave in the HRG.

The above described circuit converts a digital word that specifies the amplitude of a known frequency into an analog sine wave equivalent. In the example discussed, the resultant sine wave generated has a known amplitude of better than 0.1 PPM referred to a full scale of the converter. In this manner, the circuit supplies the necessary control voltage to maintain the resonant standing wave of a HRG at null in the presence of inertial rates. An advance of the present invention is that an unchanging relationship is maintained between the input digital word and the resultant sine wave amplitude due to the time based nature of the converter of the present invention.

A primary advantage of the present invention is that the output signal is a very slowly varying periodic signal, unlike other processes which generate very rapid, mostly non-periodic signals. The applications for a digital-to-analog converter with a time-based conversion process is adaptable to endless applications which require more accuracy than prior art time invariant digital converters. It is to be understood that the example used to illustrate the benefits and advantages of the present invention is provided for illustration only, and that the time based digital-to-analog converter of the present invention may be applied to other applications. Moreover, those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A time based digital to analog converter comprising:

signal computing means for calculating a fraction of an input signal required for an output digital signal;

compute pulse width means for determining periods of a connected clock corresponding to the fraction of the input signal;

net output block means for determining a net output from the periods of the connected clock;

gate array means for generating wave forms corresponding to said periods of the connected clock using a switching logic; and routing means for routing the signals corresponding to said waveforms to control electrodes configured to interpret said waveforms, where said waveforms combine to produce a periodic signal.

2. A time based digital converter for converting a digital word to a precise analog sinusoidal signal comprising:

means for computing an amplitude of an analog sinusoidal signal;

means for receiving the amplitude of the analog sinusoidal signal, and for receiving a clock signal from a connected clock, and for calculating a pulse width corresponding to the amplitude received from said means for computing an amplitude and the clock signal;

means for generating a waveform instruction for controlling a gate array means based on the pulse width and the amplitude gate array means for generating a first waveform from first reference voltage source connected to said gate array means, and a second waveform from a second reference voltage source connected to said gate array means, where a period of said first and second waveforms are controlled by said pulse width; and means for combining said first and second waveforms into a periodic analog signal having a desired amplitude and period.

3. An inertial input processing circuit for a hemispherical resonator gyroscope comprising:

rate control means for computing a fraction of a maximum opposing inertial rate that is required to null a standing wave precessing due to an inertial input;

compute pulse width means for determining periods of a connected clock corresponding to the fraction of the maximum opposing inertial rate;

net rate block means for determining a net rate from the periods of the connected clock;

gate array means for generating wave forms corresponding to said periods of the connected clock using a switching logic;

routing means for routing the signals corresponding to said waveforms to control electrodes on the hemispherical resonator gyroscope for nulling the standing wave.

4. A hemispherical resonator gyroscope having a time based digital-to-analog conversion of a precision variable, said digital-to-analog converter comprising:

a rate determining software component for calculating the rate of a standing wave precess under the influence of an inertial input;

a pulse width software component for converting the rate calculated by the rate determining software component into digital words corresponding to a repetitive signal needed to null the standing wave;

a net rate software element for recomputing the rate estimate to account for truncation, based on the digital words converted from said pulse width software component;

a gate array comprising digital counters for generating digital signals corresponding to the digital words and the number of periods of a clock attached to the gate array, where said gate array uses digital logic to switch between reference voltage sources to create a repetitive signal from waveforms of varying periods; and a connection between said gate array and control means on said hemispherical resonator gyroscope for nulling the standing wave based on the repetitive signal from said gate array.

5. A method for nulling an oscillation from a digital signal comprising the steps of:

computing an amplitude digital word representing a fraction of a maximum sine wave voltage signal required to null the oscillation;

determining first and second period digital words to be used as counters in a gate array;

determining a net rate which is proportional to an amplitude of a first harmonic sine wave of a resultant repetitive signal;

providing a gate array comprising dedicated digital counters for generating two digital signals; and generating a repetitive signal with a variable period selected from the values of the first and second period digital words.

6. The method of claim 5, wherein the two digital signals control switching elements that switch between a positive reference voltage and a negative reference voltage.

7. The method of claim 6, where the variable period is comprised of two calculated variables.

8. The method of claim 7, where the two calculated variables are computed from the amplitude digital word.

9. A method for generating a variable sine wave to null a digital input comprising the steps of computing a fraction of a maximum amplitude sine wave to null the digital input;

calculate first and second periods of the variable sine wave based on the fraction of the maximum amplitude sine wave;

communicate the first and second periods of the variable sine wave to a gate array connected to two reference voltage signal generators; and combining the two reference voltage signals from the reference voltage signal generators according to the calculated first and second periods.

10. A digital to analog converter for generating a variable period sine wave comprising:

a digital amplitude determiner for evaluating the digital amplitude of the variable period sine wave;

a pulse width generator for calculating the variable periods of the sine wave based on a frequency of an input signal and said digital amplitude of the variable period sine wave;

a gate array for controlling two reference voltage signals according to said variable periods of the sine wave, with each reference voltage signal assigned to one of said periods; and a switching circuit for combining the two reference voltage signals into a composite variable period sine wave.

11. The digital to analog converter of claim 10 wherein the gate array is connected to a clock mechanism.

12. The digital to analog converter of claim 11 wherein said two reference voltage signals correspond to a constant positive voltage and a constant negative voltage.

13. The digital to analog converter of claim 12 wherein said constant positive voltage signal and said constant negative voltage signal have equal magnitudes.

14. The digital to analog converter of claim 13 wherein said input signal is taken from pickoff electrodes on a vibratory sensor.

15. The digital to analog converter of claim 14 wherein said vibratory sensor is a hemispherical resonator gyroscope.

* * * * *